United States Patent
Tokimasa et al.

(10) Patent No.: US 10,380,424 B2
(45) Date of Patent: Aug. 13, 2019

(54) OBJECT DETECTION DEVICE AND OBJECT DETECTION METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuhiro Tokimasa, Kariya (JP); Toyoharu Katsukura, Kariya (JP); Yoshihisa Ogata, Kariya (JP); Youhei Masui, Kariya (JP); Taku Sakima, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota, Aichi-ken (JP)

( * ) Notice: Subject to any disclaimer, the term of this patent is extended or adjusted under 35 U.S.C. 154(b) by 0 days.

(21) Appl. No.: 15/529,925

(22) PCT Filed: Oct. 13, 2015

(86) PCT No.: PCT/JP2015/078909
§ 371 (c)(1),
(2) Date: May 25, 2017

(87) PCT Pub. No.: WO2016/084502
PCT Pub. Date: Jun. 2, 2016

(65) Prior Publication Data
US 2017/0330033 A1 Nov. 16, 2017

(30) Foreign Application Priority Data
Nov. 28, 2014 (JP) ................................. 2014-242232

(51) Int. Cl.
*G01S 7/40* (2006.01)
*G01V 3/12* (2006.01)
(Continued)

(52) U.S. Cl.
CPC ........ *G06K 9/00664* (2013.01); *G01S 7/4026* (2013.01); *G01S 13/867* (2013.01);
(Continued)

(58) Field of Classification Search
CPC ........... G01S 13/931; G01S 2013/9353; G01S 2013/9346; G01S 7/411
(Continued)

(56) References Cited

U.S. PATENT DOCUMENTS 6,993,425 B2 * 1/2006 Tange ................ B60K 31/0008
340/435
7,212,901 B2 * 5/2007 Sadano ..................... B60T 7/22
348/148

(Continued)

FOREIGN PATENT DOCUMENTS

JP 2003-084064 A 3/2003
JP 2013-164390 A 8/2013

*Primary Examiner* — Yosef Kassa
(74) *Attorney, Agent, or Firm* — Knobbe, Martens, Olson & Bear, LLP (57) ABSTRACT

Provided is an object detection device (13) using a detection means (11) to transmit probe waves, receive reflected waves from an object (50) in a detection range, and acquire, as first detection information on the object, a position based on the reflected waves, to detect the object. The device includes an image information acquisition means, determination region setting means, and an object locating means. The image information acquisition means acquires, as second detection information on the object, a position based on an image of an area within the detection range, the image being captured by an image capturing means (12). The determination region setting means sets a determination region in the detection (Continued)

range. The object locating means locates the object, based on the first detection information, if pieces of the first and second detection information are present in the determination region.

10 Claims, 6 Drawing Sheets (51) Int. Cl.
  *G01V 8/00* (2006.01)
  *G06K 9/00* (2006.01)
  *G06T 7/12* (2017.01)
  *G08G 1/16* (2006.01)
  *G01S 13/86* (2006.01)
  *G01S 13/93* (2006.01)
  *H04N 5/243* (2006.01)

(52) U.S. Cl.
  CPC .............. *G01S 13/931* (2013.01); *G01V 3/12* (2013.01); *G01V 8/005* (2013.01); *H04N 5/243* (2013.01); *G01S 2007/4034* (2013.01); *G01S 2013/9375* (2013.01); *G06T 7/12* (2017.01); *G08G 1/166* (2013.01)

(58) Field of Classification Search
  USPC ....... 382/170, 209, 190, 278, 282, 286, 291; 348/92, 143, 161, 174
  See application file for complete search history.

(56) References Cited

U.S. PATENT DOCUMENTS

| | | | | |
|---|---|---|---|---|
| 7,667,366 | B2* | 2/2010 | Zhang | H02K 1/24 |
| | | | | 310/216.135 |
| 7,667,636 | B2* | 2/2010 | Kikuchi | B60W 10/184 |
| | | | | 342/70 |
| 7,680,569 | B2* | 3/2010 | Matsumoto | B60T 8/17557 |
| | | | | 180/167 |
| 8,090,537 | B2* | 1/2012 | Nishira | G05D 1/0214 |
| | | | | 340/436 |
| 8,145,385 | B2* | 3/2012 | Hayakawa | B60W 10/06 |
| | | | | 340/436 |
| 8,258,935 | B2* | 9/2012 | Hashimoto | B62D 15/029 |
| | | | | 180/167 |
| 8,427,361 | B2* | 4/2013 | Sato | G01S 7/354 |
| | | | | 342/107 |
| 8,831,286 | B2* | 9/2014 | Li | G02B 27/28 |
| | | | | 382/103 |
| 9,223,311 | B2* | 12/2015 | Matsuno | G08G 1/167 |
| 2016/0009282 | A1 | 1/2016 | Tokimasa et al. | |

* cited by examiner

OBJECT DETECTION DEVICE AND OBJECT DETECTION METHOD

CROSS-REFERENCE TO RELATED APPLICATION

This application is based on and claims the benefit of priority from earlier Japanese Patent Application No. 2014-242232 filed on Nov. 28, 2014 the descriptions of which is incorporated herein by reference.

TECHNICAL FIELD

The present disclosure relates to object detection technologies, implemented on, for example, a vehicle, for detecting an object around the vehicle.

BACKGROUND ART

Object detection devices are known which periodically transmit probe waves such as millimeter waves over a predetermined range of angles around a vehicle, and detect an object around the vehicle upon receiving reflected waves.

In a vehicle equipped with an object detection device of this type, the position, azimuth, and relative velocity of another vehicle (a preceding vehicle) present ahead of the own vehicle in its direction of travel are calculated, and the speed of the own vehicle is controlled accordingly to maintain a constant distance therebetween (see PTL 1).

CITATION LIST

Patent Literature

[PTL 1] JP 2013-164390 A

SUMMARY OF THE INVENTION

Technical Problem

The object detection device of PTL 1 detects a preceding vehicle, using, for example, millimeter waves. Accordingly, when, for example, the rear of a preceding vehicle has a small reflection area, reflected waves from the preceding vehicle's rear are weak. According to the object detection device of PTL 1, a threshold for the amplitude of reflected waves to be received is low so that a preceding vehicle can be located based on weak reflected waves. This configuration enables the object detection device to locate a preceding vehicle having a small reflection area at its rear.

The low threshold may, however, permit reception of reflected waves from the portion of the road surface between the own vehicle and the preceding vehicle, causing the object detection device to erroneously determine that the preceding vehicle is present at that portion of the road surface. In addition, although areas diagonally in front of the own vehicle are out of a detection range since the probe waves are weak, the object detection device may receive reflected probe waves if a preceding vehicle traveling diagonally ahead of the own vehicle has high reflectivity against the probe waves. In that case, the object detection device calculates the position of the preceding vehicle, based on the reflected waves, assuming that the reflected waves have traveled from within the detection range. Accordingly, with the position determination based on reflected waves, the preceding vehicle may be erroneously detected as being present ahead of the own vehicle when no preceding vehicle is actually present ahead of the own vehicle.

An object of the present disclosure is to provide object detection technologies that minimize the risk of erroneously determining the position of an object.

Solution to Problem

An object detection device of the present disclosure causes a detection means to transmit probe waves, receive reflected waves from an object present in a detection range, and acquire, as first detection information on the object, a position based on the reflected waves, to detect the object. The object detection device includes an image information acquisition means, determination region setting means, and object locating means. The image information acquisition means acquires a position based on an image of an area within the detection range, the image captured by an image capturing means. The determination region setting means sets a determination region in a part of the area in the detection range. The object locating means locates the object, based on the first detection information, if pieces of the first and second detection information are present in the determination region.

Advantageous Effects of the Invention

With the object detection means configured to determine the position of the object around the own vehicle using the first detection information based on the reflected waves from the object, the object detection means may receive waves reflected off anything other than the object, erroneously determining that the object is present at the position from which the reflected waves have traveled. To address this concern, the object detection device of the present disclosure, as described above, acquires, as the second detection information on the object, the position based on the captured image. Further, the object detection device sets the determination region around the own vehicle, and locates the object, using the first detection information, if pieces of the first and second detection information are included in the determination region. Thus, the object detection device of the present disclosure excludes, from control information, first detection information based on reflected waves from anything other than the object. This configuration minimizes the risk of erroneously determining the object's position, resulting in an improved control accuracy.

DESCRIPTION OF THE EMBODIMENTS

An embodiment of the present disclosure will be hereinafter described with reference to the drawings. A vehicle control device having an object detection device is mounted on a vehicle. The vehicle control device has an adaptive cruise control (ACC) function, which causes the own vehicle to follow a preceding vehicle detected by the object detection device such that a distance between the own vehicle and the preceding vehicle is adjusted to a target value according to the vehicle speed. When no preceding vehicle is detected, the vehicle control device adjusts the speed of the own vehicle to a target value.

Figure 1:
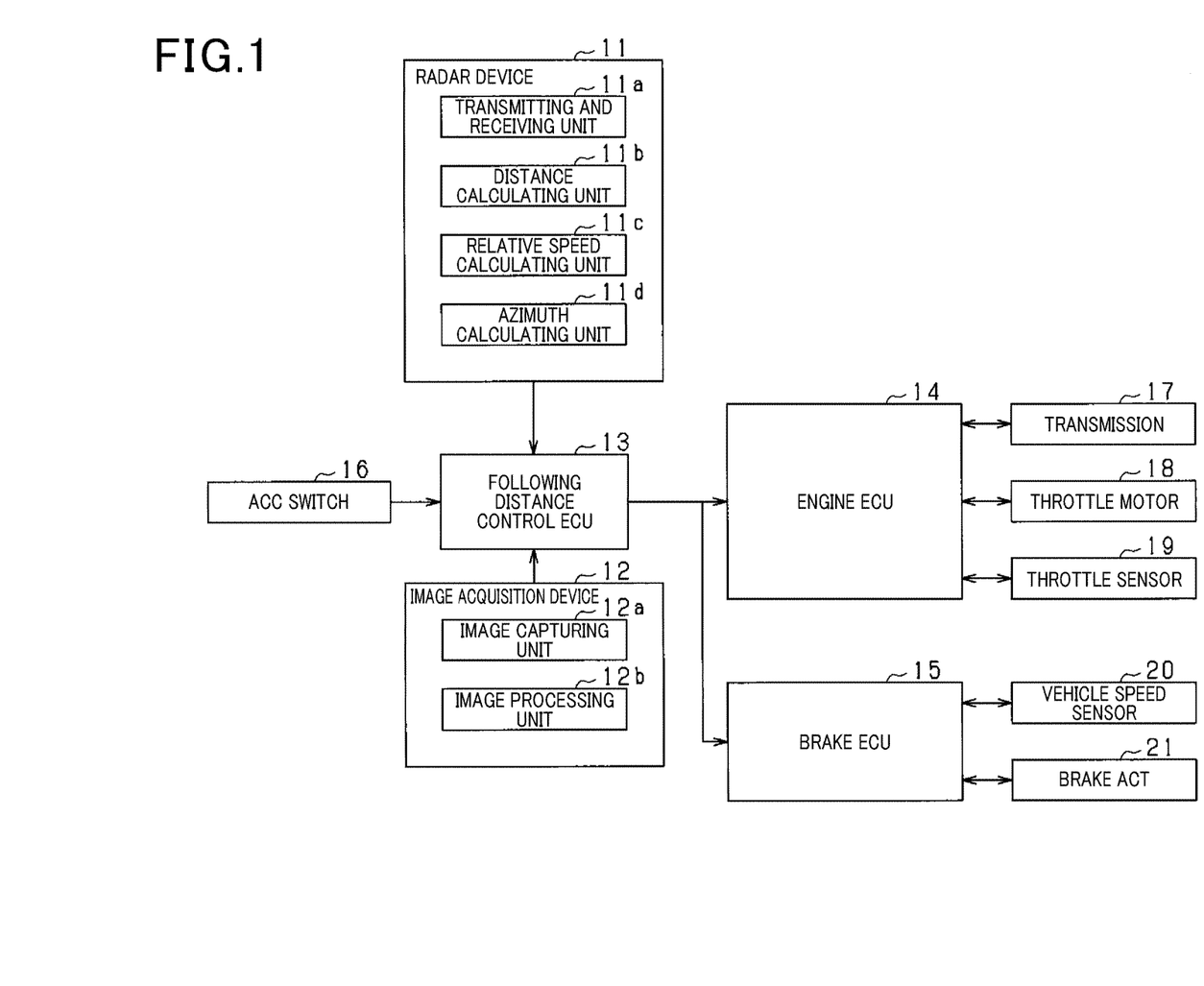
FIG. 1 illustrates a configuration of a vehicle control device according to an embodiment.

Referring to FIG. 1, the vehicle control device according to the present embodiment includes a radar device 11, image acquisition device 12, following distance control ECU 13, engine ECU 14, and brake ECU 15. In the vehicle control device, the following distance control ECU 13 uses pieces of information acquired from the radar device 11 and image acquisition device 12, to function as the object detection device, and cooperates with the engine ECU 14 and brake ECU 15, to control the distance between the own vehicle and the preceding vehicle.

The radar device 11, image acquisition device 12, and ECUs 13 to 15 are communicatively connected to each other via an in-vehicle network. Through dedicated lines for, for example, serial communication, an ACC switch 16 is connected to the following distance control ECU 13; a transmission 17, throttle motor 18, and throttle sensor 19 are connected to the engine ECU 14; a vehicle speed sensor 20 and brake ACT (actuator) 21 are connected to the brake ECU 15.

The radar device 11, image acquisition device 12, and ECUs 13 to 15 are information processors having mounted thereon a microcomputer, and interface of a wire harness, for example. The microcomputer includes a CPU, ROM, RAM, I/O port, and CAN communication device.

The radar device 11 is a detection means for determining the position of a preceding vehicle. The radar device 11 determines the distance, relative speed, and relative position of a preceding vehicle with respect to the own vehicle, and transmits the results of these determinations to the following distance control ECU 13. The image acquisition device 12 is an image capturing means for capturing an image of, for example, an object. The image acquisition device 12 acquires an image of the own vehicle's surroundings, processes the image in a predetermined manner, and transmits the results of this processing to the following distance control ECU 13.

Based on the information on the preceding vehicle, transmitted from the radar device 11 and image acquisition device 12, the current speed, acceleration, and the like of the preceding vehicle, the following distance control ECU 13 transmits to the engine ECU 14 and brake ECU 15 a target value for the acceleration of the own vehicle.

The ACC switch 16 is operated by a driver for the ACC. In response to this, the following distance control ECU 13 transmits a target value for the own vehicle's acceleration to the engine ECU 14 and brake ECU 15. Examples of driver's operations for the ACC include turning on/off of the ACC, switching between a mode for keeping the following distance constant and a mode for keeping the vehicle speed constant, and inputting the vehicle speed.

The engine ECU 14 controls the throttle motor 18 while monitoring the throttle position gauged by the throttle sensor 19. For example, the engine ECU 14 determines the throttle position according to a target value for the own vehicle's acceleration, received from the following distance control ECU 13, and the current vehicle speed, based on table data in which throttle positions are associated with vehicle speeds and target values for the own vehicle's acceleration. Additionally, the engine ECU 14 determines whether the transmission 17 needs to be shifted, based on the vehicle speed and the throttle position. If the transmission 17 needs to be shifted, the engine ECU 14 sets a gear range of the transmission 17.

The brake ECU 15 brakes the own vehicle by controlling the opening and closing and the position of the valve of the brake ACT 21. The brake ACT 21 controls the acceleration (or the deceleration) of the own vehicle by increasing, maintaining, or reducing a pressure transmitted to a wheel cylinder of each wheel, using a pressure generated in a working fluid (e.g., oil) by a pump. The brake ECU 15 brakes the own vehicle according to a target value for the own vehicle's acceleration, transmitted by the following distance control ECU 13.

The radar device 11 is a radar device that transmits, for example, a high-frequency signal in the millimeter band. The radar device 11 determines the position of an object in a detection range set within a predetermined detection angle ahead of the own vehicle. Specifically, the radar device 11 includes a transmitting and receiving unit 11a that transmits probe waves, and receives reflected waves via a plurality of antennas, and a distance calculating unit 11b that calculates the distance between the own vehicle and the preceding vehicle. The radar device 11 also includes a relative speed calculating unit 11c that calculates the relative speed between the own vehicle and the preceding vehicle, and an azimuth calculating unit 11d that calculates the azimuth of the preceding vehicle relative to the own vehicle. The distance calculating unit 11b calculates the distance between the own vehicle and the preceding vehicle, using the time at which probe waves are transmitted and the time at which reflected waves are received. The relative speed calculating unit 11c calculates the relative speed, using the frequency of waves reflected off the preceding vehicle (the frequency changed by the Doppler effect). The azimuth calculating unit 11d calculates the azimuth of the preceding vehicle, using the phase difference between reflected waves received by the plurality of antennas. With the position and azimuth of the preceding vehicle calculated, the radar device 11 can determine the relative position of the preceding vehicle relative to the own vehicle. The radar device 11 transmits probe waves to the preceding vehicle and receives waves reflected off the preceding vehicle, periodically. The radar device 11 also calculates a reflection position, which is the position at which probe waves are reflected, and calculates the relative velocity between the own vehicle and the preceding vehicle, periodically. Thus, the radar device 11 transmits, as first detection information, information that includes at least a reflection position (the position based on the reflected waves) to the following distance control ECU 13.

The image acquisition device 12 has an image capturing unit 12a. The image capturing unit 12a is a monocular image capturing device, examples of which include a CCD camera, CMOS image sensor, and near infrared camera. The image capturing unit 12a is mounted to the middle of the vehicle in its width direction at a predetermined height, and captures an image of an area that extends ahead of the vehicle over a predetermined range of angles (i.e., the detection range of the radar device 11) from a bird's-eye perspective. An image processing unit 12b extracts characteristic points in the image captured by the image capturing unit 12a (i.e., characteristic points indicating the presence of the preceding vehicle). Specifically, the image processing unit 12b extracts edge points, based on information on the brightness of the image, and subjects the extracted edge points to the Hough transform. Examples of the characteristic points extracted through the Hough transform include successive edge points on a straight line and a point at which straight lines cross each other at right angles. The image acquisition device 12 acquires an image and extracts characteristic points for each control cycle identical to or different from that of the radar device 11. Thus, the image acquisition device 12 transmits, as second detection information, information that includes at least the results of extracting the characteristic points (i.e., the position based on the captured image of an area within the detection range) to the following distance control ECU 13.

Figure 2:
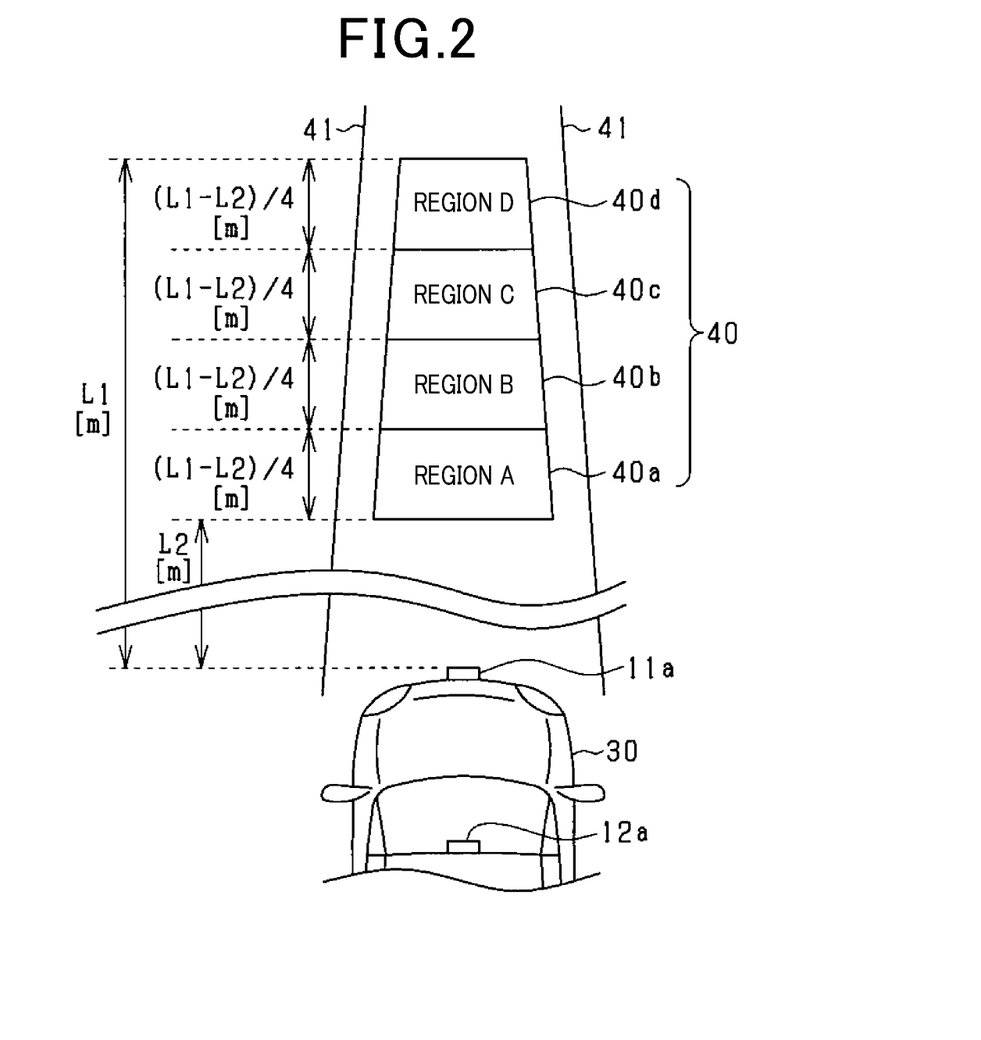
FIG. 2 illustrates a determination region.
Figure 3:
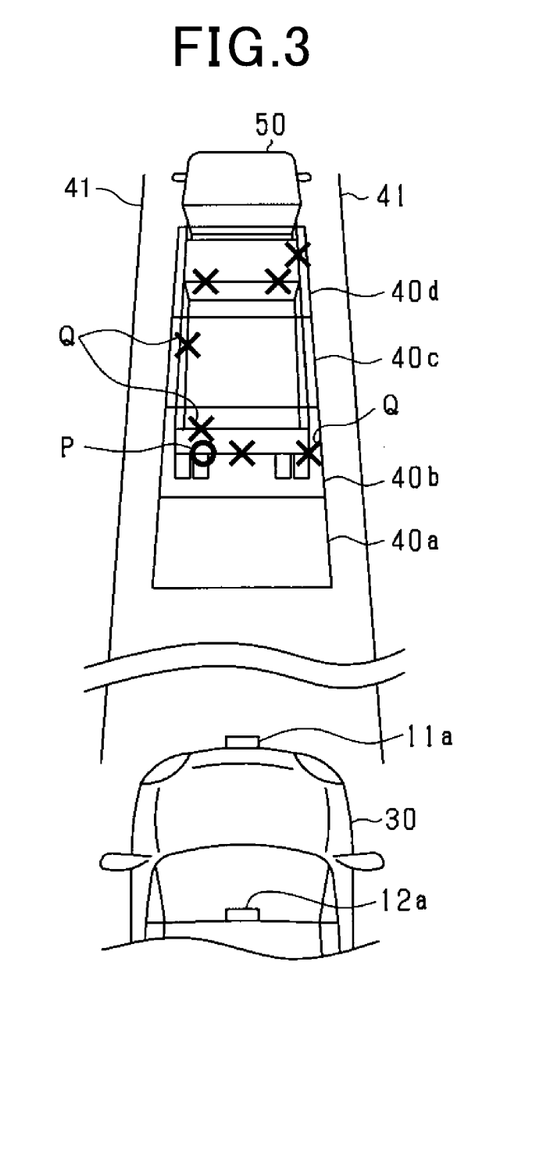
FIG. 3 illustrates a reflection position and a characteristic point of a preceding vehicle present in the determination region.

With reference to FIGS. 2 and 3, a description will be given of a process executed by the following distance control ECU 13 according to the present embodiment (i.e., a process for locating the preceding vehicle, using a reflection position and characteristic point). As shown in FIG. 2, the transmitting and receiving unit 11a of the radar device 11 is mounted to the front bumper of the own vehicle 30, and the image capturing unit 12a of the image acquisition device 12 is mounted to the rearview mirror located at the upper portion of the windshield.

A determination region 40, which is a virtual region, is set ahead of the own vehicle 30, within the detection range of the radar device 11. In setting the determination region 40, the following distance control ECU 13 functions as a determination region setting means. The determination region 40 is set in front of the own vehicle 30 so as to extend from a position L1 [m] apart from the front bumper of the own vehicle 30 to a position L2 [m] apart from the front bumper. As described above, the image capturing unit 12a captures an image of an area ahead of the own vehicle 30 from a bird's-eye perspective. With this configuration, a part of the detection range of the radar device 11 is blocked by the front of the own vehicle 30, making it impossible for the image capturing unit 12a to capture an image of an area extending from the front bumper of the own vehicle 30 to a position less than L2 [m]. A lower limit is therefore set on the determination region 40.

An upper limit on the determination region 40 is determined based on, for example, a threshold for the amplitude of reflected waves to be received. For example, assume that a low threshold is set for the amplitude of reflected waves to be received, to allow determination of a position based on reflected waves from a small surface area (a surface area with low reflectivity) such as the rear of the preceding vehicle. In this case, reflected waves from a surface located a predetermined distance or more away from the front bumper of the own vehicle 30 (i.e., a surface area with low reflectivity) are attenuated as a function of the distance, and has its amplitude reduced to less than the threshold, rendering the reflective waves undetectable. If the reflected waves are detected in the case, however, it means that the reflected waves have traveled from a surface area with high reflectivity. When an object with high reflectivity is located on the road ahead of the vehicle in its direction of travel, it is highly likely that the object is a preceding vehicle. Therefore, the upper limit distance on the determination region 40 is such that any reflected wave which has traveled from a surface area with low reflectivity and at a distance beyond the upper limit distance is not received by the radar device 11.

The width of the determination region 40 in a lateral direction, which is orthogonal to the direction of travel of the own vehicle 30 (i.e., the width of the determination region 40), is determined based on a transmission-reception range of the radar device 11. Alternatively, the width of the determination region 40 may be set based on the distance between lane separation lines 41, such as white lines.

The determination region 40 is divided into four different regions: a region A 40a, region B 40b, region C 40c, and region D 40d. The regions 40a, 40b, 40c, and 40d are equal in length in the direction of travel of the vehicle. Accordingly, each of the regions 40a, 40b, 40c, and 40d has a length of (L1−L2)/4 [m].

As shown in FIG. 3, the following distance control ECU 13 acquires a reflection position P from the radar device 11 as first detection information. The following distance control ECU 13 also acquires characteristic points Q from the image acquisition device 12 as the second detection information. The following distance control ECU 13 locates a preceding vehicle 50, based on whether the reflection position P and the characteristic points Q are present in the determination region 40. A detailed description will be given of a process for locating the preceding vehicle 50, performed by the following distance control ECU 13 when the preceding vehicle 50 is present and the reflection position P and characteristic points Q are acquired.

The reflection position P, which indicates a position where probe waves are reflected off the preceding vehicle 50, generally indicates the location of, for example, the rear of the preceding vehicle 50. In the present embodiment, any region of the determination region 40 where the reflection position P is present is determined as a first region. In the example shown in FIG. 3, the region B 40b serves as the first region.

Characteristic points Q are extracted from a linear portion or right-angled portion of the preceding vehicle 50, as described above. FIG. 3 shows an example where in the region A 40a, no characteristic point Q is extracted; in the region B 40b, three; in the region C 40c, one; and in the region D 40d, three. If the number of characteristic points Q extracted from a region is less than a predetermined number, it is difficult to determine whether the preceding vehicle 50 is present in that region. Accordingly, in the present embodiment, it is determined that the preceding vehicle 50 is present in a region when a predetermined number or more of characteristic points Q are extracted from that region. The characteristic points Q are extracted from a linear portion or right-angled portion of the preceding vehicle 50, and the image capturing unit 12a captures an image of the preceding vehicle 50 from a bird's-eye perspective. Accordingly, a larger number of characteristic points Q are likely to be extracted from the rear of the preceding vehicle 50. In addition, when maintaining a constant distance between the vehicles, the own vehicle is controlled with reference to the rear of the preceding vehicle 50. Accordingly, in the present embodiment, the region closest to the own vehicle 30, among the regions in the determination region 40 where at least a predetermined number of characteristic points Q are extracted, is determined as a second region, which is a region where characteristic points Q are extracted. In the example shown in FIG. 3, the region B 40b serves as the second region. In the present embodiment, the presence of the preceding vehicle 50 is determined when a plurality of the characteristic points Q is present. Thus, it can also be said that the second region is a region where the presence of the preceding vehicle 50 has been recognized (i.e., the recognition region).

If the first and second regions, which have been determined using the above method, are at the same position, the reflection position P is used as the position of the preceding vehicle 50. When an image of the preceding vehicle 50 is captured from a bird's-eye perspective, and characteristic points Q of the preceding vehicle 50 are extracted from a planar image, the characteristic points Q are extracted from a position deviating from the actual position of the preceding vehicle 50. According to the present embodiment, the following distance control ECU 13 determines whether the reflection position P should be used for locating the preceding vehicle 50, based on the positional relationship between the first and second regions.

Figure 4A:
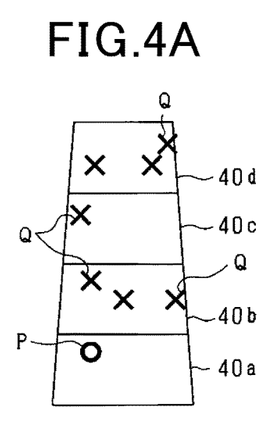
FIG. 4A illustrates a relationship between a first region and a second region.
Figure 4B:
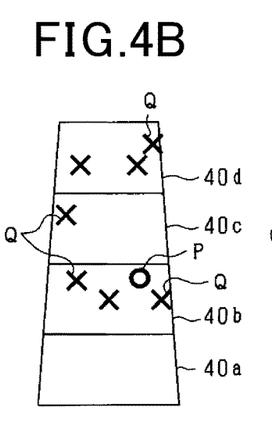
FIG. 4B illustrates another relationship between a first region and a second region.
Figure 4C:
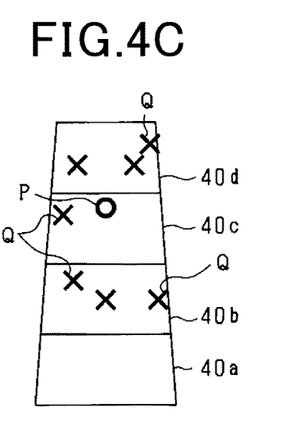
FIG. 4C illustrates yet another relationship between a first region and a second region.

With reference to FIGS. 4A to 4C, a description will be given of a process executed by the following distance control ECU 13 based on the positional relationship between the first and second regions (i.e., a process of determining whether the reflection position P is used for locating the preceding vehicle 50). FIG. 4 (a) shows an example where the region A 40a serves as the first region, and the region B 40b serves as the second region. In this case, it is possible that the reflected waves have traveled from the ground. If the reflection position P of the reflected waves is used as the position of the preceding vehicle 50, it is determined that the preceding vehicle 50 is closer than the actual position to the own vehicle 30. Accordingly, the following distance control ECU 13 determines that the reflection position P is not used for locating the preceding vehicle 50 if the first region is located closer than the second region to the own vehicle 30.

FIG. 4B shows an example where the region B 40b serves as both the first and second regions. In this case, it is highly likely that the preceding vehicle 50 is present at the reflection position P, and hence it is determined that the reflection position P will be used for locating the preceding vehicle 50.

FIG. 4C shows an example where the region C 40c serves as the first region, and the region B 40b serves as the second region. In this case, the reflection position P is located farther from the own vehicle 30 than the region where a plurality of characteristic points Q is detected. As described above, the actual position of the preceding vehicle 50 may deviate from the position where characteristic points Q are extracted. Accordingly, an error in the position based on the characteristic points Q is greater than the error in the position calculated by the radar device 11. However, the extracted characteristic points Q indicate that it is highly likely that the preceding vehicle 50 is present at a position farther from the own vehicle 30 than the second region. Accordingly, the reflection position P can be determined as the position of reflection by the preceding vehicle 50. In this case, therefore, it is determined that the reflection position P will be used as the position of the preceding vehicle 50.

The image capturing unit 12a captures an image of an area ahead of the vehicle from a bird's-eye perspective, and converts the image into a planar image. Accordingly, the distance between the reflection position P acquired by the radar device 11 and the own vehicle 30 deviates from the distance between each characteristic point Q acquired by the image acquisition device 12 and the own vehicle 30. The following distance control ECU 13 according to the present embodiment corrects the deviation when determining in which region the reflection position P is present, among the regions A 40a to D 40d in the determination region 40.

Figure 5:
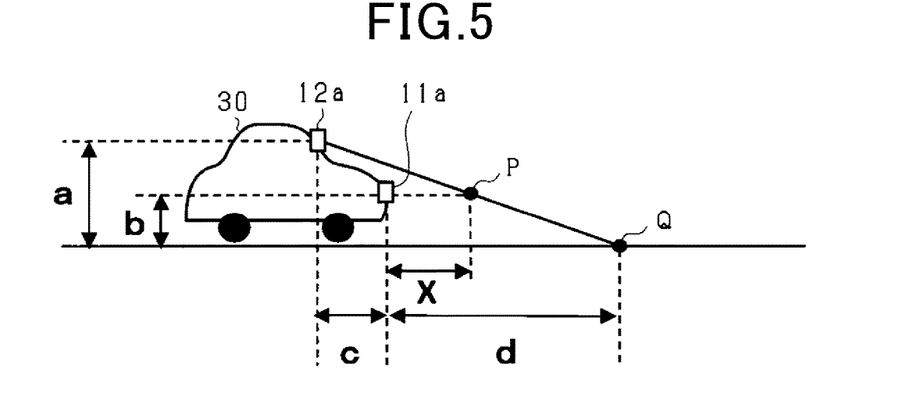
FIG. 5 illustrates a positional relationship between a reflection position and a determination region when one of the reflection position and the determination region is corrected.

FIG. 5 shows a positional relationship between the reflection position P acquired by the radar device 11 and the characteristic point Q based on the reflection position P. In the present embodiment, the distance between the road surface and the image capturing unit 12a is denoted as a [m], and the distance between the road surface and the transmitting and receiving unit 11a is denoted as b [m]. In addition, the horizontal distance between the image capturing unit 12a and the transmitting and receiving unit 11a is denoted as c [m], the horizontal distance between the transmitting and receiving unit 11a and the characteristic point Q is denoted as d [m], and the distance between the transmitting and receiving unit 11a and the reflection position P is denoted as X [m]. In the present embodiment, the following formula (1) holds using similarity of triangles.

$$a:(c+d)=(a-b):(c+X) \tag{1}$$

Further, in the present embodiment, this formula (1) is rearranged to solve for the distance X between the transmitting and receiving unit 11a and the reflection position P, so that the following formula (2) is obtained.

$$X=(a-b)*(c+d)/a-c \tag{2}$$

If the determination region 40 is set on a horizontal plane passing through the transmitting and receiving unit 11a, the formula (2) is used to transform the position of the characteristic point Q. If the determination region 40 is set on the road surface, the formula (1) may be rearranged to solve for the horizontal distance d between the characteristic point Q and the transmitting and receiving unit 11a, to transform the reflection position P.

Figure 6:
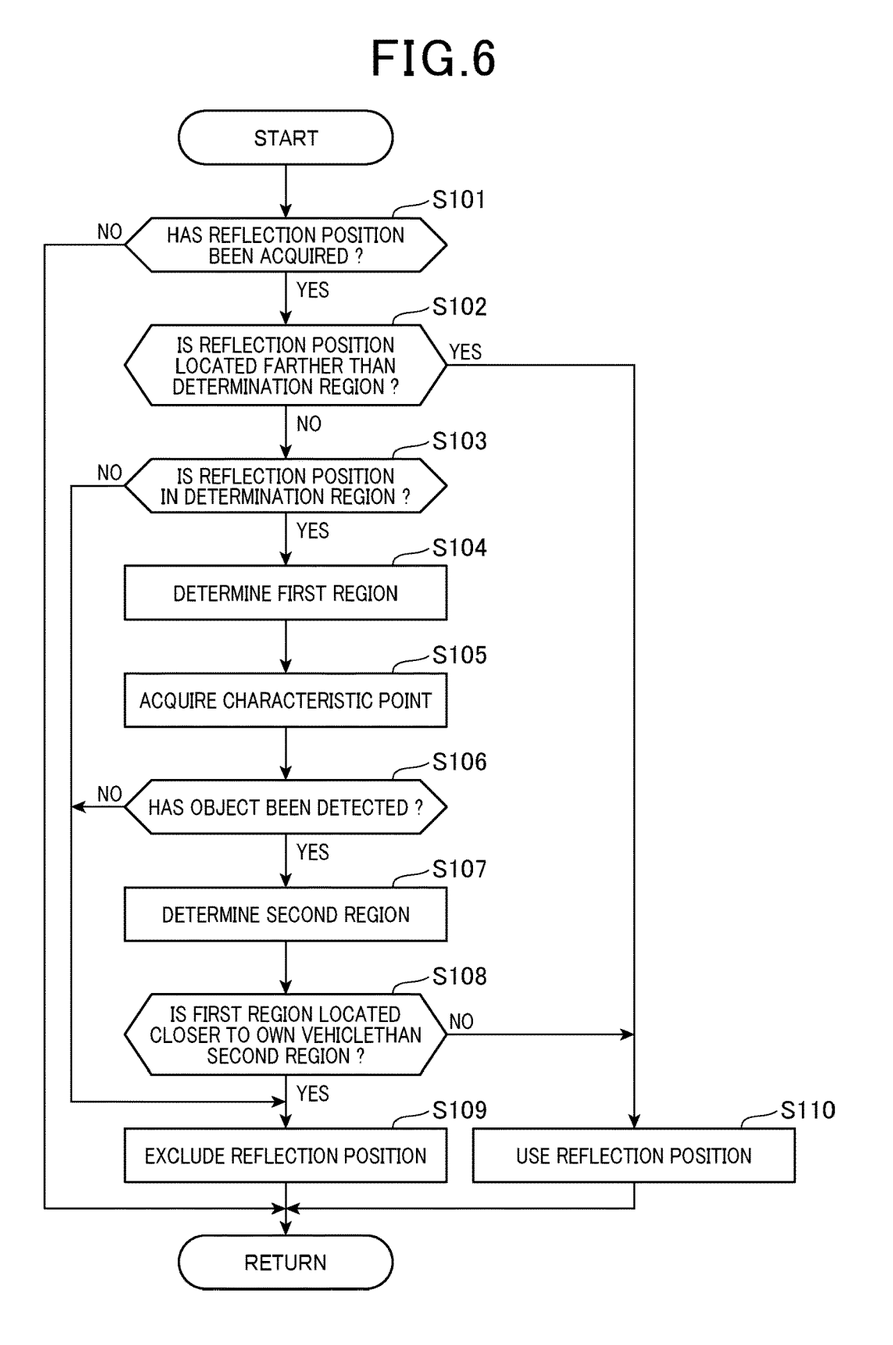
FIG. 6 illustrates a flowchart of a process according to the embodiment.

With reference to a flowchart of FIG. 6, a description will be given of a process executed by the following distance control ECU 13 according to the present embodiment. The process shown in the flowchart of FIG. 6 is executed periodically.

The following distance control ECU 13 determines whether the reflection position P has been acquired from the radar device 11 (S101). If the following distance control ECU 13 determines that the reflection position P has not been acquired (NO at S101), the process terminates, because the preceding vehicle 50 cannot be located in this control cycle. In this case, if the position of the preceding vehicle 50 was acquired in a previous control cycle, the position is used to estimate the position of the preceding vehicle 50.

If it is determined that the reflection position P has been acquired (YES at S101), the following distance control ECU 13 determines whether the reflection position P is located farther from the own vehicle 30 than the determination region 40 (i.e., is located farther than the determination region) (S102). If it is determined that the reflection position P is located farther than the determination region 40 (YES at S102), the following distance control ECU 13 determines that it is highly likely that the reflection position P is a position where the reflected waves have traveled from the preceding vehicle 50. The following distance control ECU 13 then uses the reflection position P to locate the preceding vehicle 50 (S 110). If it is determined that the reflection position P is not located farther than the determination region 40 (i.e., the reflection position P is located closer to the own vehicle 30 than the determination region 40) (NO at S102), the following distance control ECU 13 determines whether the reflection position P is in the determination region 40 (S103). If it is determined that the reflection position P is in the determination region 40 (YES at S103), the following distance control ECU 13 determines, as the first region, a region that includes the reflection position P, among the regions A 40a to D 40d (S104). Since the processes at S102 and S103 are for determining whether the reflection position P is in the determination region 40, or is located farther than the determination region 40, or is located closer than the determination region 40, the processes at S102 and S103 do not need to be performed in the above order. Additionally, at S102, the following distance control ECU 13 may instead determine whether the reflection position P is located closer than the determination region 40.

Subsequently, the following distance control ECU 13 acquires information on the characteristic points Q from the image acquisition device 12 (S105). At this time, the following distance control ECU 13 functions as an image information acquisition means. The following distance control ECU 13 then determines whether an object such as the preceding vehicle 50 has been detected in the determination region 40 (S106). At this time, the following distance control ECU 13 determines whether an object has been detected, based on whether at least a predetermined number of characteristic points Q are included in at least one of the regions A 40a to D 40d in the determination region 40. If it is determined that an object has been detected in the determination region 40 (i.e., there is a region that includes at least a predetermined number of characteristic points Q) (YES at S106), the following distance control ECU 13 determines, as the second region, the region closest to the own vehicle 30, among the regions each including at least a predetermined number of characteristic points Q (S107).

With the first and second regions determined, the following distance control ECU 13 determines whether the first region is located closer to the own vehicle 30 than the second region (S108).

If it is determined that the first region is located closer to the own vehicle 30 than the second region (YES at S108), the following distance control ECU 13 determines that it is highly likely that the reflection position P is a position where the reflected waves have traveled from the portion of the ground between the own vehicle 30 and the preceding vehicle 50. Consequently, the following distance control ECU 13 excludes the reflection position P included in the first region in the process for locating the preceding vehicle 50 (S109). In other words, if it is determined that the first region is located closer to the own vehicle 30 than the second region, the following distance control ECU 13 does not use the reflection position P included in the first region as a basis for locating the preceding vehicle 50. If it is determined that the reflection position P is located closer to the own vehicle 30 than the determination region 40 (NO at S103), the following distance control ECU 13 determines that it is highly likely that the reflection position P is a position where the reflected waves have traveled from the portion of the ground between the own vehicle 30 and the preceding vehicle 50. Consequently, the following distance control ECU 13 excludes the reflection position P included in the first region in the process for locating the preceding vehicle 50 (S109). If it is determined that no object has been detected in the determination region 40 (i.e., there is no region that includes at least a predetermined number of characteristic points Q) (NO at S106), the following distance control ECU 13 determines that it is highly likely that the reflection position P is a position where the reflected waves have traveled from the portion of the ground between the own vehicle 30 and the preceding vehicle 50. Consequently, the following distance control ECU 13 excludes the reflection position P included in the first region in the process for locating the preceding vehicle 50 (S109). In this case, if the position of the preceding vehicle 50 was acquired in a previous control cycle, the position is used to perform a process of, for example, estimating the position of the preceding vehicle 50. The following distance control ECU 13 functions as an object locating means by executing the processes at S102 to S104 and S106 to S 110.

If it is determined that the first region is not located closer to the own vehicle 30 than the second region (i.e., is located farther than the second region) (NO at S108), the following distance control ECU 13 determines that it is highly likely the reflection position P is a position where the reflected waves have traveled from the preceding vehicle 50. Consequently, the following distance control ECU 13 uses the reflection position P included in the first region to locate the preceding vehicle 50 (S 110). The following distance control ECU 13 thereby controls the own vehicle 30, based on the determined position of the preceding vehicle 50.

With the configuration described above, the object detection device according to the present embodiment produces the following effects.

If the position of the preceding vehicle 50 is determined using reflected waves from the preceding vehicle 50, an object detection device may receive reflected waves from the portion of the ground between the preceding vehicle 50 and the own vehicle 30, erroneously determining that the preceding vehicle 50 is present at that portion of the ground. To address this concern, the object detection device according to the present embodiment captures an image of an area ahead of the own vehicle 30, and acquires characteristic points Q of the preceding vehicle 50 from the captured image. Further, the object detection device sets the determination region 40 around the own vehicle 30, and determines whether the characteristic points Q, which indicate the presence of the preceding vehicle 50, and the reflection position P are included in the determination region 40. If the characteristic points Q, which indicate the presence of the preceding vehicle 50, and the reflection position P are included in the determination region 40, then the object detection device uses the reflection position P to locate the preceding vehicle 50. Thus the object detection device according to the present embodiment excludes, from control information, waves reflected from anything other than the preceding vehicle 50 (e.g., the ground), resulting in an improved control accuracy.

According to the object detection device of the present embodiment, the determination region 40 is divided into a plurality of regions: the regions A 40a to D 40d. Thus the object detection device according to the present embodiment achieves improved accuracy in determining whether the reflection position P indicates the position of the preceding vehicle 50.

According to the object detection device of the present embodiment, when the own vehicle 30 is controlled to follow the preceding vehicle 50, an area ahead of the own vehicle 30 in its direction of travel is searched for locating the preceding vehicle 50. Because the vehicle-following control is based on the distance between the own vehicle 30 and a preceding vehicle in its direction of travel, it is necessary to minimize the risk that the object detection device erroneously determines the distance between the own vehicle 30 and the preceding vehicle 50, in the direction of travel, when such control is performed. According to the object detection device of the present embodiment, the regions A 40a to D 40d are set in the determination region 40, based on the distance between the own vehicle 30 and the preceding vehicle 50 in its direction of travel. This configuration minimizes the risk that the object detection device according to the present embodiment erroneously determines the distance between the own vehicle 30 and the preceding vehicle 50.

If the first region that includes the reflection position P is located closer to the own vehicle 30 than the second region that includes at least a predetermined number of characteristic points Q, the reflected waves may have traveled from, for example, the ground. According to the object detection device of the present embodiment, if the first region is located closer to the own vehicle 30 than the second region, the reflection position P is excluded in the process for locating the preceding vehicle 50. In other words, the reflection position will not be used for locating the preceding vehicle 50. This configuration minimizes the risk that the object detection device according to the present embodiment erroneously determines the position of the preceding vehicle 50, resulting in an improved control accuracy.

When the second region is determined using the characteristic points Q in a planar image of an area ahead of the own vehicle, the image being captured from a bird's-eye perspective, the actual position of the preceding vehicle 50 may deviate from the position where the characteristic points Q are extracted, as a result of, for example, coordinate transformation. At this time, if a plurality of characteristic points Q is detected, it is highly likely that the preceding vehicle 50 is present at a position farther than the second region. According to the object detection device of the present embodiment, if the first region is present at a position farther than the second region, the reflection position P is used to locate the preceding vehicle 50. This configuration minimizes the risk that the object detection device of the present embodiment fails to determine the position of the preceding vehicle 50.

When the reflection position P is present at a position farther than the determination region 40, it is highly likely that the reflected waves have traveled from an object with high reflectivity, and that this object is the preceding vehicle 50. According to the object detection device of the present embodiment, when the reflection position P is present at a position farther than the determination region 40, the reflection position P is used to locate the preceding vehicle 50, regardless of the characteristic points Q in the determination region 40. According to the object detection device of the present embodiment, in locating the preceding vehicle 50 present at a position farther than the determination region 40, the object detection device achieves improved accuracy in detecting the preceding vehicle 50 without excluding the reflection position P.

When characteristic points Q are extracted from a captured image of the preceding vehicle 50, the characteristic points Q are extracted in a plurality of the regions in the determination region 40, depending on the length of the preceding vehicle 50 in its direction of travel. When the own vehicle 30 is controlled to follow the preceding vehicle 50, the position of the rear of the preceding vehicle 50 needs to be determined. According to the object detection device of the present embodiment, if characteristic points Q are extracted in a plurality of the regions in the determination region 40, the region closest to the own vehicle 30 is determined as the second region. Accordingly, with the object detection device of the present embodiment, the reflection position P based on the position of the rear of the preceding vehicle 50 is determined as the position of the preceding vehicle 50. This configuration enables the object detection device to determine the following distance between the own vehicle 30 and the preceding vehicle 50 with greater accuracy.

(Modifications)

In the above embodiment, whether the reflection position P is used for determining the position of the preceding vehicle 50 is determined based on the first region that includes the reflection position P and the second region that includes at least a predetermined number of characteristic points Q. Alternatively, the process of determining the first region may be omitted, and whether the reflection position P is used for determining the position of the preceding vehicle 50 may be determined based on the result of determination as to whether the reflection position P is included in the second region, or is present at a position closer to the own vehicle 30 than the second region, or is present at a position farther from the own vehicle 30 than the second region.

In the above embodiment, the determination region 40 is equally divided into four regions: the regions A 40a to D 40d. The determination region 40 may not be equally divided, and may be divided into any number of regions. In that case, it is determined whether the distance determined by the radar device 11 falls within the range of the distance between the own vehicle 30 and the farthest point of the determination region 40, or is less than the distance between the own vehicle 30 and the closest point of the determination region 40, or is greater than the distance between the own vehicle 30 and the farthest point of the determination region 40. If it is determined that the distance determined by the radar device 11 is greater than the distance between the own vehicle 30 and the farthest point of the determination region 40, the distance is used. If it is determined that the distance determined by the radar device 11 falls within the determination region 40, the distance is adopted when characteristic points Q have been detected. If it is determined that the distance determined by the radar device 11 is less than the distance between the own vehicle 30 and the closest point of the determination region 40, the distance is not adopted.

In the above embodiment, the determination region 40 has a trapezoidal shape. Alternatively, the determination region 40 may have a shape of a sector having its center on the front of the own vehicle 30, for example. The plurality of regions A 40a to D 40d in the determination region 40 may be formed by dividing the determination region 40 with concentric arcs.

Although in the above embodiment, the region that includes at least a predetermined number of characteristic points Q is determined as the second region, a region that includes only one characteristic point Q may also be determined as the second region.

Although in the above embodiment, the radar device 11 is configured to transmit and receive millimeter waves, the radar device 11 may transmit and receive electromagnetic waves other than millimeter waves.

Although in the above embodiment, the object detection device is mounted on vehicles, the object detection device may be mounted on mobile machines other than vehicles, such as airplanes or ships.

REFERENCE SIGNS LIST

11: Radar device, 12: Image acquisition device, 13: Following distance control ECU (Object detection device), 40: Determination region, 30: Own vehicle, 50: Preceding vehicle.

The invention claimed is:

1. An object detection device mounted on a mobile machine that includes a detection means and an image capturing means, the detection means configured to transmit probe waves and receive reflected waves from an object in a detection range, the image capturing means configured to capture one or more images of an area within the detection range, the reflected waves associated with first detection information and the one or more images associated with second detection information, the object detection device comprising:
an image information acquisition means configured to acquire the second detection information on the object using the one or more images;
a determination region setting means configured to set a determination region in the detection range; and
an object locating means for locating configured to locate the object using the first detection information,
wherein the object locating means:
utilizes the second detection information to determine a recognition region, in the determination region, where the object has been recognized to be present,
utilizes the first detection information to determine a location of at least a portion of the object in the recognition region, and
based on the location of the portion of the object being determined to be farther away from the mobile machine than the recognition region, the object locating means utilizes the first detection information to locate the object.

2. The object detection device according to claim 1, wherein
the determination region setting means
sets a plurality of the determination regions in the detection range, and based on the number of pieces of the second detection information in each of the determination regions, determines any one of the plurality of the determination regions as the recognition region.

3. An object detection device using a detection means configured to transmit probe waves and receive reflected waves from an object in a detection range, the reflected waves associated with first detection information,
the object detection device comprising:
an image information acquisition means configured to acquire second detection information on the object using one or more images captured of an area within an image capturing range;
a determination region setting means for setting configured to set a determination region in the detection range; and
an object locating means configured to locate the object using the first detection information,
wherein the object locating means:
utilizes the first detection information to determine a position of at least a portion of the object, and
based on the position of the portion of the object being determined to be farther than the determination region, the object locating means utilizes the first detection information to locate the object.

4. The object detection device according to claim 3, wherein
the object locating means
determines, in the determination region, a recognition region where the object has been recognized to be present, based on the second detection information, and locates the object, based on the recognition region and the first detection information.

5. The object detection device according to claim 4, wherein
the object detection device is mounted on a mobile machine that includes the detection means and the image capturing means, and
the object locating means
does not perform the locating of the object based on the first detection information, in response to the position based on the first detection information being at a position closer to the mobile machine than the determination region.

6. The object detection device according to claim 5, wherein
the object locating means
performs the locating of the object, based on the first detection information, in response to the position based on the first detection information being in the same region as the recognition region or being at a position farther from the mobile machine than the recognition region.

7. The object detection device according to claim 4, wherein
the determination region setting means
sets a plurality of the determination regions in the detection range, and based on the number of pieces of the second detection information in each of the determination regions, determines any one of the plurality of the determination regions as the recognition region.

8. An object detecting method using a detecting means configured to transmit probe waves and receive reflected waves from an object in a detection range, the reflected waves associated with first detection information,
the object detecting method comprising:
acquiring second detection information on the object using one or more images captured of an area within an image capturing range;
determining a recognition region where the object has been recognized to be present using the second detection information;
setting a determination region in the detection range; and
locating the object using the first detection information,
wherein locating the object comprises:
utilizing the first detection information to determine a position of at least a portion of the object, and
based on the position of the portion of the object being determined to be farther than the recognition region, utilizing the first detection information to locate the object.

9. An object detection device mounted on a mobile machine that includes a detection unit and an image capturing unit, the detection unit configured to transmit probe waves and receive reflected waves from an object in a detection range the image capturing unit configured to capture one or more images of an area within an image capturing range, the reflected waves associated with first detection information and the one or more images associated with second detection information,
the object detection device comprising:
a memory;
a processor communicable to the memory; and
a set of computer-executable instructions stored on the memory that cause the processor to implement:
acquiring the second detection information on the object using the one or more images captured by the image capturing unit;

setting a determination region in the detection range;
locating the object using the first detection information,
determining a recognition region where the object has been recognized to be present using the second detection information; and
locating the object using the first detection information,
wherein locating the object comprises:
utilizing the first detection information to determine a position of at least a portion of the object, and
based on the position of at least a portion of the object being determined to be farther from the mobile machine than the recognition region, utilizing the first detection information to locate the object.

10. An object detection device using a detection unit configured to transmit probe waves and receive reflected waves from an object in a detection range, the reflected waves associated with first detection information, the object detection device comprising:
a memory;
a processor communicable to the memory; and
a set of computer-executable instructions stored on the memory that cause the processor to implement:
acquiring second detection information on the object using one or more images captured by an image capturing unit;
setting a determination region in the detection range;
locating the object using the first detection information,
wherein locating the object comprises:
utilizing the first detection information to determine a position of at least a portion of the object, and
based on the position of at least a portion of the object being determined to be farther than the determination region, utilizing the first detection information to locate the object.

* * * * *

UNITED STATES PATENT AND TRADEMARK OFFICE
CERTIFICATE OF CORRECTION

| | |
|---|---|
| PATENT NO. | : 10,380,424 B2 |
| APPLICATION NO. | : 15/529925 |
| DATED | : August 13, 2019 |
| INVENTOR(S) | : Mitsuhiro Tokimasa |

Page 1 of 1

It is certified that error appears in the above-identified patent and that said Letters Patent is hereby corrected as shown below:

In the Claims

In Column 13, Line 13, Claim 1, delete "means for locating configured to" and insert --means configured to--.

In Column 13, Line 48, Claim 3, delete "means for setting configured to" and insert --means configured to--.

Signed and Sealed this
Twenty-fourth Day of December, 2019

Andrei Iancu
*Director of the United States Patent and Trademark Office*